(12) United States Patent
Shidore et al.

(10) Patent No.: US 12,115,837 B2
(45) Date of Patent: Oct. 15, 2024

(54) SYSTEM AND METHOD FOR ESTIMATING QUALITY OF REFRIGERANT AT INLET OF COMPRESSOR IN THERMAL SYSTEM OF ELECTRIC VEHICLE

(71) Applicant: GM GLOBAL TECHNOLOGY OPERATIONS LLC, Detroit, MI (US)

(72) Inventors: Neeraj S. Shidore, Novi, MI (US); Min Sun, Troy, MI (US); David Eugene Edwards, Rochester Hills, MI (US); Ryan D. Hopper, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 17/493,452

(22) Filed: Oct. 4, 2021

(65) Prior Publication Data
US 2023/0107888 A1 Apr. 6, 2023

(51) Int. Cl.
*B60H 1/32* (2006.01)
*G01N 11/00* (2006.01)
*G01N 11/02* (2006.01)

(52) U.S. Cl.
CPC ........... *B60H 1/3205* (2013.01); *G01N 11/02* (2013.01); *B60H 2001/325* (2013.01); *B60H 2001/3257* (2013.01); *G01N 2011/0093* (2013.01)

(58) Field of Classification Search
CPC ............... B60H 1/3205; B60H 1/3211; B60H 2001/325; B60H 2001/3257; B60H 2001/3275; G01N 11/02; G01N 2011/0093; G01N 9/00; G06F 17/18; G06N 20/00; G06N 3/006; Y02P 80/10; F25B 2500/19; F25B 2700/1933; F25B 2700/21172; F24F 11/30; B60L 58/26
USPC ..... 62/125, 127, 129; 700/108; 702/50, 183, 702/182, 188, 185, 83
See application file for complete search history.

(56) References Cited

FOREIGN PATENT DOCUMENTS

| CN | 106568249 A | * | 4/2017 | |
| --- | --- | --- | --- | --- |
| DE | 102013021360 B4 | * | 12/2022 | ......... B60H 1/00278 |
| FR | 3001527 A1 | * | 8/2014 | ............... F24H 4/02 |
| JP | 3679323 B2 | * | 8/2005 | .............. F25B 9/008 |

* cited by examiner

*Primary Examiner* — Jeffrey P Aiello (57) ABSTRACT

A system includes a compressor outlet temperature module, a refrigerant quality module, and a correction factor module. The compressor outlet temperature module is configured to estimate a temperature at an outlet of a compressor in a thermal system of an electric vehicle. The refrigerant quality module is configured to estimate a quality of refrigerant at an inlet of the compressor based on an enthalpy at the compressor inlet and an inlet enthalpy correction factor. The refrigerant quality is a ratio of vapor refrigerant mass to total refrigerant mass. The correction factor module is configured to determine the inlet enthalpy correction factor based on the estimated compressor outlet temperature and a temperature measured at the compressor outlet.

20 Claims, 3 Drawing Sheets

SYSTEM AND METHOD FOR ESTIMATING QUALITY OF REFRIGERANT AT INLET OF COMPRESSOR IN THERMAL SYSTEM OF ELECTRIC VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for estimating a quality of refrigerant at an inlet of a compressor in a thermal system of an electric vehicle.

A thermal system for a vehicle is operable to heat or cool air circulating through a passenger cabin of the vehicle and to heat or cool coolant circulating through a propulsion system of the vehicle. A vehicle thermal system typically includes a compressor, a condenser, an expansion valve, an evaporator, and chiller. The compressor circulates refrigerant through the thermal system. The condenser transfers heat from the refrigerant to ambient air or to the cabin air. The expansion valve decreases the pressure of the refrigerant. The evaporator transfers heat from the cabin air to the refrigerant. The chiller transfers heat from the coolant to the refrigerant.

In a thermal system for an electric vehicle, the compressor is typically an electric, scroll-type compressor. The propulsion system for an electric vehicle typically includes an electric motor and a battery pack, which may not generate enough heat to maintain the cabin air at a target temperature. Thus, in some cases, the thermal system for an electric vehicle includes an electric coolant heater that supplements the amount of heat transferred to the coolant by the propulsion system.

SUMMARY

An example of a system according to the present disclosure includes a compressor outlet temperature module, a refrigerant quality module, and a correction factor module. The compressor outlet temperature module is configured to estimate a temperature at an outlet of a compressor in a thermal system of an electric vehicle. The refrigerant quality module is configured to estimate a quality of refrigerant at an inlet of the compressor based on an enthalpy at the compressor inlet and an inlet enthalpy correction factor. The refrigerant quality is a ratio of vapor refrigerant mass to total refrigerant mass. The correction factor module is configured to determine the inlet enthalpy correction factor based on the estimated compressor outlet temperature and a temperature measured at the compressor outlet.

In one aspect, the correction factor module is configured to determine the inlet enthalpy correction factor based on the estimated and measured compressor outlet temperatures using a Kalman filter.

In one aspect, the correction factor module is configured to determine the inlet enthalpy correction factor in a current iteration based on the inlet enthalpy correction factor from a previous iteration, a Kalman filter gain, and the estimated and measured compressor outlet temperatures.

In one aspect, the compressor outlet temperature module is configured to estimate the compressor outlet temperature using a linear model of work performed by the compressor.

In one aspect, the compressor outlet temperature module is configured to estimate the compressor outlet temperature based on the compressor inlet enthalpy, an enthalpy at the compressor outlet, and a mass flow rate of refrigerant flowing through the compressor.

In one aspect, the compressor outlet temperature module is configured to estimate the compressor outlet temperature in a current iteration based on the compressor inlet and outlet enthalpies from a previous iteration and the refrigerant mass flow rate from the previous iteration.

In one aspect, the system further includes a compressor enthalpy module configured to determine the compressor inlet enthalpy in a current iteration based on the estimated refrigerant quality from a previous iteration, a temperature measured at the compressor inlet, and a pressure measured at the compressor inlet.

In one aspect, the compressor enthalpy module is configured to determine the compressor outlet enthalpy based on the measured compressor outlet temperature and a pressure measured at the compressor outlet.

In one aspect, the system further includes a refrigerant density module, a refrigerant flow rate module, and a compressor power module. The refrigerant density module is configured to determine a density of refrigerant at the compressor inlet based on the estimated refrigerant quality. The refrigerant flow rate module is configured to determine a mass flow rate of refrigerant flowing through the compressor based on the refrigerant density. The compressor power module is configured to determine a power output by the compressor based on the refrigerant mass flow rate, the compressor inlet enthalpy, and an enthalpy at the compressor outlet.

In one aspect, the system further includes an actuator control module configured to control at least one of the compressor and a heat exchanger in the thermal system based on at least one of the refrigerant mass flow rate and the compressor power.

Another example of a system according to the present disclosure includes a compressor outlet temperature module and a refrigerant quality module. The compressor outlet temperature module is configured to estimate a temperature at an outlet of a compressor in a thermal system of an electric vehicle based on an enthalpy at an inlet of the compressor, an enthalpy at the compressor outlet, and a mass flow rate of refrigerant flowing through the compressor. The refrigerant quality module is configured to estimate a quality of refrigerant at the compressor inlet based on the estimated compressor outlet temperature and a temperature measured at the compressor outlet. The refrigerant quality is a ratio of vapor refrigerant mass to total refrigerant mass.

In one aspect, the compressor outlet temperature module is configured to estimate the compressor outlet temperature using a linear model that relates the compressor outlet temperature to the compressor inlet and outlet enthalpies and the refrigerant mass flow rate.

In one aspect, the compressor outlet temperature module is configured to estimate the compressor outlet temperature in a current iteration based on the compressor inlet and outlet enthalpies from a previous iteration and the refrigerant mass flow rate from the previous iteration.

In one aspect, the system further includes a compressor enthalpy module configured to determine the compressor inlet enthalpy in a current iteration based on the estimated refrigerant quality from a previous iteration, a temperature measured at the compressor inlet, and a pressure measured at the compressor inlet.

In one aspect, the compressor enthalpy module is configured to determine the compressor outlet enthalpy based on the measured compressor outlet temperature and a pressure measured at the compressor outlet.

In one aspect, the refrigerant quality module is configured to estimate the refrigerant quality based on a difference between the estimated and measured compressor outlet temperatures.

In one aspect, the refrigerant quality module is configured to estimate the refrigerant quality based on the compressor inlet enthalpy and an inlet enthalpy correction factor.

In one aspect, the system further includes a correction factor module configured to determine the inlet enthalpy correction factor based on the estimated and measured compressor outlet temperatures using a Kalman filter.

In one aspect, the correction factor module is configured to determine the inlet enthalpy correction factor in a current iteration based on the inlet enthalpy correction factor from a previous iteration, a Kalman filter gain, and the estimated and measured compressor outlet temperatures.

A method according to the present disclosure includes estimating a temperature at an outlet of a compressor in a thermal system of an electric vehicle, estimating a quality of refrigerant at an inlet of the compressor based on an enthalpy at the compressor inlet and an inlet enthalpy correction factor, and determining the inlet enthalpy correction factor based on the estimated compressor outlet temperature and a temperature measured at the compressor outlet. The refrigerant quality is a ratio of vapor refrigerant mass to total refrigerant mass.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The quality of refrigerant entering the compressor of a thermal system for an electric vehicle may affect the performance of the thermal system and/or the life of the compressor. Refrigerant quality is a ratio of a mass of vapor refrigerant to a total mass of vapor refrigerant and liquid refrigerant. Liquid refrigerant has a greater density than vapor refrigerant. Thus, for a given compressor speed, the mass flow rate of refrigerant flowing through the compressor increases as the refrigerant quality decreases and vice versa. As a result, changes in the refrigerant quality may lead to inaccurate calculations of the refrigerant mass flow rate, which can adversely affect the performance and efficiency of the thermal system when performing cabin cooling, cabin heating, or propulsion system cooling. In addition, liquid refrigerant entering the compressor may damage the compressor.

To address these issues, a control system according to the present disclosure determines the quality of refrigerant at an inlet of the compressor and controls one or more actuators of the thermal system based on the refrigerant quality. For example, when the refrigerant quality decreases, the control system may increase the amount of power supplied to the compressor and/or to a blower or fan that blows air past the evaporator or the condenser. The refrigerant quality at the compressor inlet cannot be accurately measured based directly on input from pressure and temperature sensors, especially in a two-phase region of a pressure-enthalpy map. Thus, a control system according to the present disclosure estimates the refrigerant quality at the compressor inlet.

In one example, the control system estimates the temperature at the compressor outlet using a physics-based linear model, and estimates the refrigerant quality based on the estimated compressor outlet temperature and a measured compressor outlet temperature. In one example, the thermal system control module estimates the refrigerant quality based on an enthalpy at the compressor inlet and an inlet enthalpy correction factor. The thermal system control module recursively determines the inlet enthalpy correction factor based on the estimated and measured compressor outlet temperatures using a Kalman filter.

Figure 1:
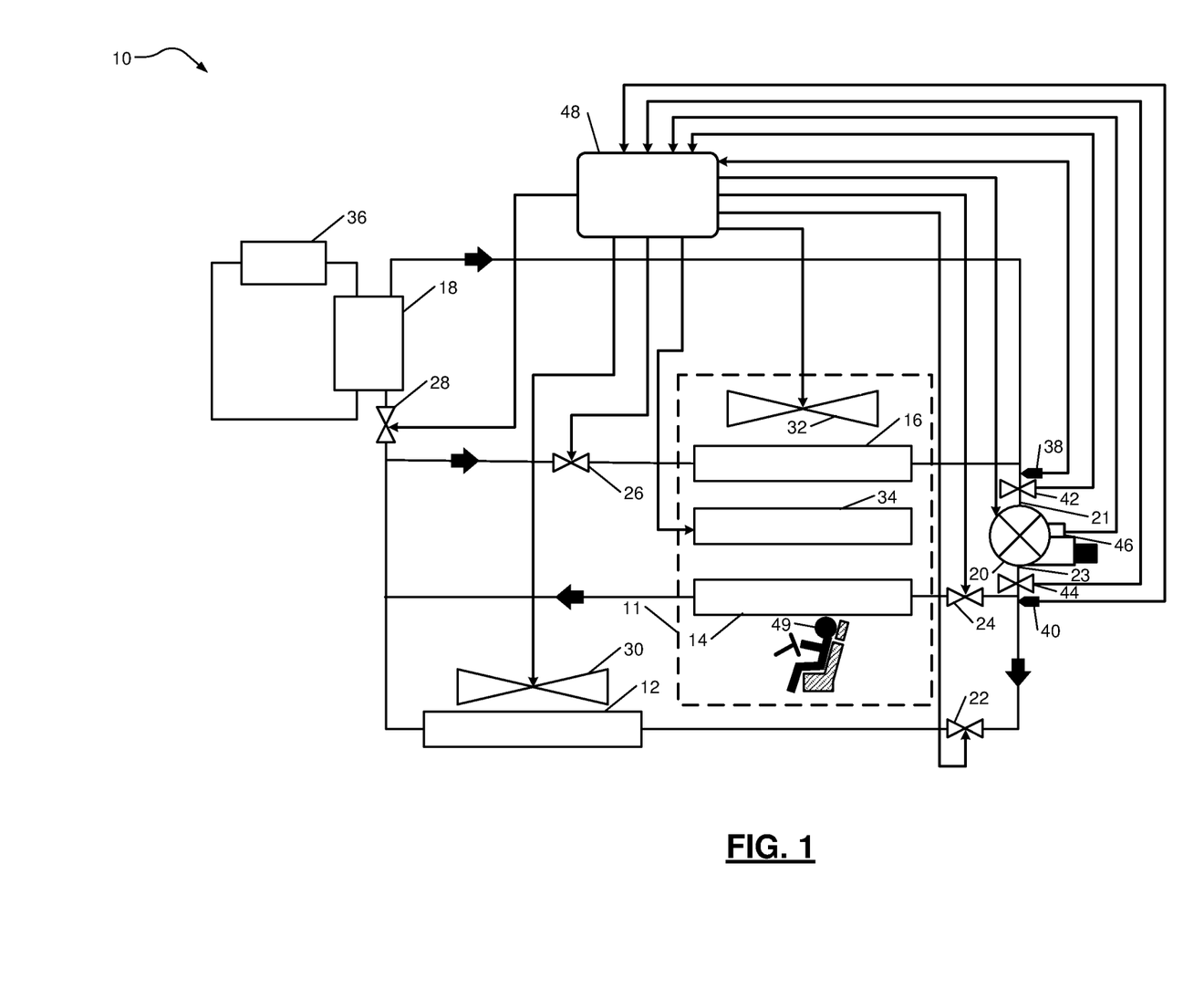
FIG. 1 is an example of an electric vehicle thermal system according to the present disclosure.

Referring now to FIG. 1, a thermal system 10 for an electric vehicle is operable to heat or cool air circulating through a passenger cabin 11 of the electric vehicle. In addition, the thermal system 10 is operable to heat or cool coolant circulating through a propulsion system (not shown) of the electric vehicle. The propulsion system includes one or more electric motors and one or more battery packs that supply power to the electric motors. In one example, the thermal system 10 absorbs heat from the cabin air into the refrigerant to cool the passenger cabin 11, and expels heat from the refrigerant to ambient air. In another example, the thermal system 10 absorbs heat from the coolant into the refrigerant, and expels heat from the refrigerant to the cabin air to heat the passenger cabin 11.

The thermal system 10 includes an external condenser 12, a heating condenser 14, an evaporator 16, a chiller 18, a compressor 20, an external condenser flow valve 22, a heating condenser flow valve 24, an evaporator expansion valve 26, and a chiller expansion valve 28. The external condenser 12 is disposed in parallel with the heating condenser 14. The evaporator 16 is disposed in parallel with the chiller 18. The evaporator 16 and the chiller 18 are disposed downstream of the external condenser 12 and the heating condenser 14. The compressor 20 is disposed downstream of the evaporator 16 and the chiller 18 and upstream of the external condenser 12 and the heating condenser 14.

The external condenser 12 releases heat from refrigerant flowing therethrough to ambient air flowing therethrough. The external condenser 12 is disposed outside of the passenger cabin 11 of the electric vehicle, such as near the front end of the electric vehicle. The external condenser flow valve 22 regulates the flow rate of refrigerant circulating through the external condenser 12. The external condenser flow valve 22 is disposed directly upstream of the external condenser 12. In the example shown, the thermal system 10 further includes an electric fan 30 that forces ambient air through the external condenser 12.

The heating condenser 14 releases heat from refrigerant flowing therethrough to cabin air flowing therethrough. The heating condenser 14 is disposed within the passenger cabin 11 of the electric vehicle. The heating condenser flow valve 24 regulates the flow rate of refrigerant circulating through the heating condenser 14. The heating condenser flow valve 24 is disposed directly upstream of the heating condenser 14.

The evaporator 16 absorbs heat from cabin air flowing therethrough into refrigerant flowing therethrough. The evaporator expansion valve 26 reduces the pressure of refrigerant flowing therethrough, which decreases the temperature of the refrigerant entering the evaporator 16. In addition, the evaporator expansion valve 26 may be closed to prevent the flow of refrigerant to the evaporator 16. The evaporator expansion valve 26 is disposed directly upstream of the evaporator 16.

In the example shown, the thermal system 10 includes a blower 32 and an air door 34. The blower 32 forces cabin air through the heating condenser 14 and the evaporator 16. The air door 34 regulates the ratio of ambient air introduced into the passenger cabin 11 to cabin air recirculated through the passenger cabin 11. The air door 34 prevents ambient air from entering the passenger cabin when the air door 34 is fully closed, and the air door 34 introduces only ambient air into the passenger cabin 11 (i.e., does not recirculate cabin air) when the air door 34 is fully open.

The chiller 18 absorbs heat from coolant flowing therethrough into refrigerant flowing therethrough. Coolant circulated through the chiller 18 may absorb heat from the propulsion system or reject heat to the propulsion system. The chiller expansion valve 28 reduces the pressure of refrigerant flowing therethrough, which decreases the temperature of the refrigerant entering the chiller 18. In addition, the chiller expansion valve 28 may be closed to prevent the flow of refrigerant to the chiller 18. The chiller expansion valve 28 is disposed directly upstream of the chiller 18.

The compressor 20 circulates refrigerant through the thermal system 10, including the external condenser 12, the heating condenser 14, the evaporator 16, and the chiller 18, when the compressor 20 is turned on or activated. The speed of the compressor 20 may be adjustable to adjust the flow rate of refrigerant circulating through the thermal system 10. In the example shown in FIG. 1, the thermal system 10 further includes electric coolant heater 36, a compressor inlet temperature sensor 38, a compressor outlet temperature sensor 40, a compressor inlet pressure sensor 42, a compressor outlet pressure sensor 44, a compressor speed sensor 46, and a thermal system control module 48.

The electric coolant heater 36 heats coolant flowing therethrough. Coolant flows from the electric coolant heater 36 to the chiller 18. The electric coolant heater 36 heats the coolant when the electric coolant heater 36 is turned on or activated. The electric coolant heater 36 may be activated when the amount of heat transferred from the propulsion system of the electric vehicle to the coolant is insufficient to heat the cabin air to a target temperature, or when there is a reason to heat the battery.

The compressor inlet temperature sensor 38 measures the temperature of refrigerant at an inlet 21 of the compressor 20 and generates a signal indicating the compressor inlet temperature. The compressor outlet temperature sensor 40 measures the temperature of refrigerant at an outlet 23 of the compressor 20 and generates a signal indicating the compressor outlet temperature. The compressor inlet pressure sensor 42 measures the pressure of refrigerant at the compressor inlet 21 and generates a signal indicating the compressor inlet pressure. The compressor outlet pressure sensor 44 measures the pressure of refrigerant at the compressor outlet 23 and generates a signal indicating the compressor outlet pressure. The compressor speed sensor 46 measures the speed of the compressor 20 and generates a signal indicating the compressor speed.

The thermal system control module 48 controls various actuators of the thermal system 10 based on inputs from sensors. When the temperature of the cabin air is less than a target temperature (e.g., a temperature set by a user 49 of the electric vehicle), the thermal system control module 48 adjusts the actuators to transfer heat from the coolant to the cabin air. For example, the thermal system control module 48 opens the heating condenser flow valve 24 and the chiller expansion valve 28 to allow refrigerant to flow through the heating condenser 14 and the chiller 18. In addition, the thermal system control module 48 closes the external condenser flow valve 22 and the evaporator expansion valve 26 to prevent refrigerant flow through the external condenser 12 and the evaporator 16.

When the temperature of the cabin air is greater than the target temperature, the thermal system control module 48 adjusts the actuators to transfer heat from the cabin air to the ambient air via the refrigerant circulating through the thermal system 10. For example, the thermal system control module 48 opens the external condenser flow valve 22 and the evaporator expansion valve 26 to allow refrigerant to flow through the external condenser 12 and the evaporator 16. In addition, the thermal system control module 48 closes the heating condenser flow valve 24 and the chiller expansion valve 28 to prevent refrigerant flow through the heating condenser 14 and the chiller 18.

Furthermore, the thermal system control module 48 estimates the quality of refrigerant at the compressor inlet 21 based on the sensor inputs and controls various actuators of the thermal system 10 based on the estimated refrigerant quality. Refrigerant quality is a ratio of a mass of vapor refrigerant to a total mass of vapor refrigerant and liquid refrigerant. In one example, the thermal system control module 48 estimates the temperature at the compressor outlet 23 using a physics-based linear model, and estimates the refrigerant quality based on the estimated and measured compressor outlet temperatures. In one example, the thermal system control module 48 estimates the refrigerant quality based on an enthalpy at the compressor inlet 21 and an inlet enthalpy correction factor. The thermal system control module 48 determines the inlet enthalpy correction factor based on the estimated and measured compressor outlet temperatures using a Kalman filter.

Figure 2:
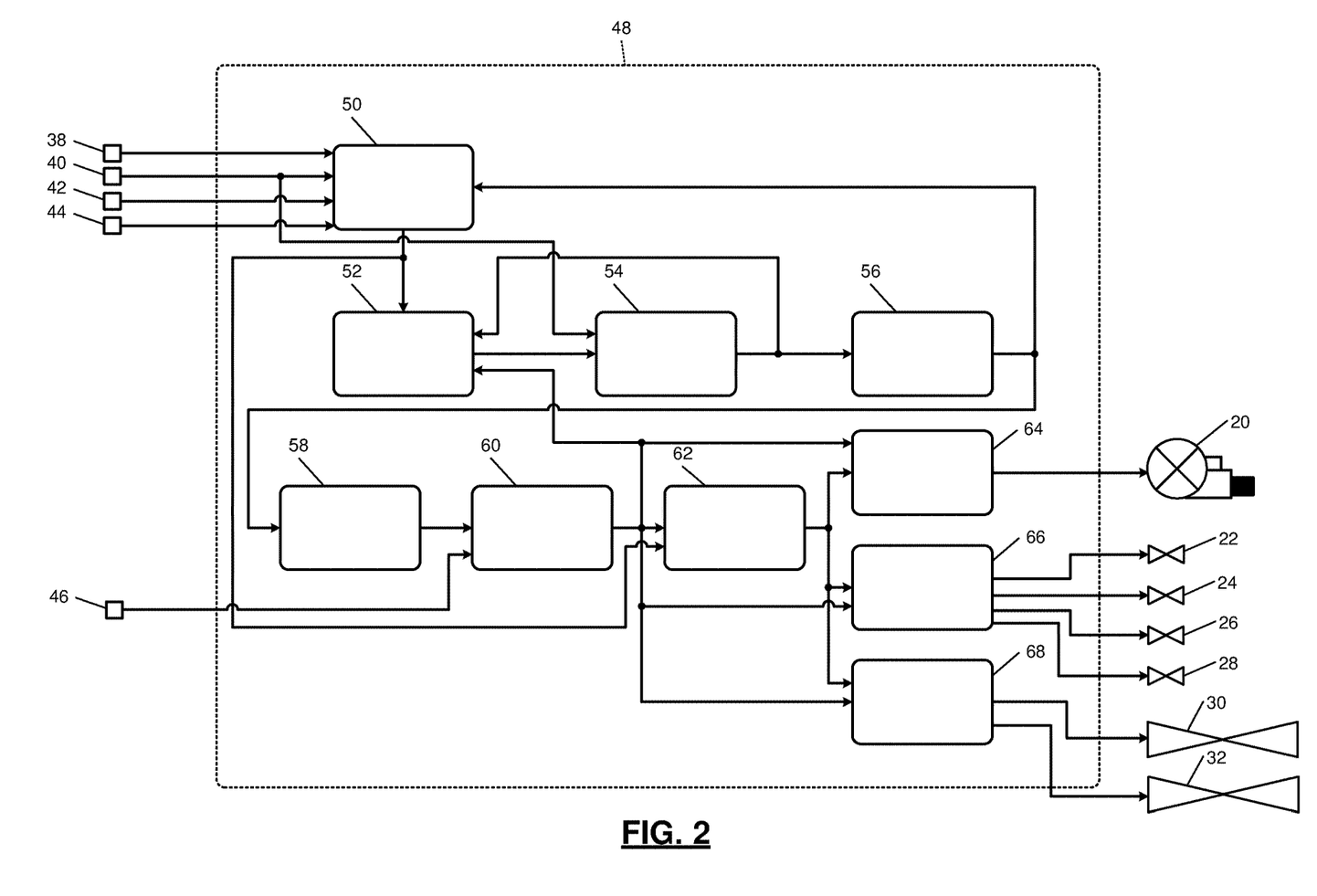
FIG. 2 is an example control system according to the present disclosure.

Referring now to FIG. 2, an example implementation of the thermal system control module 48 includes a compressor enthalpy module 50, a compressor outlet temperature module 52, a correction factor module 54, and a refrigerant quality module 56. The compressor enthalpy module 50 determines the compressor inlet enthalpy in a current iteration based on the measured compressor inlet temperature, the measured compressor inlet pressure, and the estimated refrigerant quality from a previous iteration. The compressor enthalpy module 50 makes this determination using a lookup table corresponding to refrigerant. The compressor enthalpy module 50 receives the measured compressor inlet temperature and pressure from the compressor inlet temperature and pressure sensors 38 and 42, respectively.

The compressor enthalpy module 50 determines an enthalpy at the compressor outlet 23 in both isentropic and non-isentropic conditions based on the measured compressor outlet temperature and pressure using a lookup table corresponding to superheated refrigerant. The compressor enthalpy module 50 receives the measured compressor outlet temperature and pressure from the compressor outlet temperature and pressure sensors 40 and 44, respectively.

The compressor enthalpy module 50 outputs a signal indicating the compressor inlet and outlet enthalpies.

The compressor outlet temperature module 52 estimates the compressor outlet temperature based on the compressor inlet and outlet enthalpies using a physics-based energy conservation principle for work performed by the compressor 20. For example, the compressor outlet temperature module 52 may estimate the compressor outlet temperature using a relationship such as $$\frac{dT_{co}}{dt} = \frac{\dot{m}_c\left(h_{ci} + \frac{h_{co,isentro} - h_{ci}}{\eta_k}\right) - \dot{m}_c h_{co}}{mc_c}, \quad (1)$$

where $T_{co}$ is the estimated compressor outlet temperature of the current iteration, $\dot{m}_c$ is a mass flow rate of refrigerant flowing through the compressor 20, $h_{ci}$ is the compressor inlet enthalpy, $h_{co}$ is the non-isentropic compressor outlet enthalpy, $h_{co,isentro}$ is the isentropic compressor outlet enthalpy, $\eta_k$ is a second law efficiency of the compressor 20, m is the mass of the compressor 20, and $c_c$ is the specific heat of the compressor 20. The compressor efficiency, the compressor mass, and the compressor specific heat may be predetermined.

Estimating the compressor outlet temperature based on the compressor inlet enthalpy using relationship (1) may not yield accurate results due inaccuracy in the compressor inlet enthalpy. Thus, an input enthalpy correction factor may be introduced into relationship (1) to correct for inaccuracy in the compressor inlet enthalpy. For example, the compressor outlet temperature module 52 may estimate the compressor outlet temperature using a relationship such as $$\frac{dT_{co}}{dt} = \frac{\dot{m}_c(1 + \Delta)\left(h_{ci} + \frac{h_{co,isentro} - h_{ci}}{\eta_k}\right) - \dot{m}_c h_{co}}{mc_c}, \quad (2)$$

where $\Delta$ is the inlet enthalpy correction factor.

The compressor outlet temperature module 52 may estimate the inlet enthalpy correction factor in real-time using a Kalman filter. However, relationship (2) is non-linear and therefore may be difficult to use for real-time computations in the thermal system control module 48 to estimate the inlet enthalpy correction factor. Thus, relationship (2) may be linearized to make it easier to estimate the inlet enthalpy correction factor in real time. For example, the compressor outlet temperature module 52 may estimate the compressor outlet temperature using relationships such as $$T_{CO} = T_{CO1} + \Delta T_{CO2}, \quad (3)$$

$$\frac{dT_{CO1}}{dt} = \frac{\dot{m}_c\left(h_{ci} + \frac{h_{co,isentro} - h_{ci}}{\eta_k}\right) - \dot{m}_c \frac{h_{co}}{\hat{T}_{CO} + 273.15}(T_{CO1} + 273.15)}{mc_c}, \quad (4)$$

and $$\frac{dT_{CO2}}{dt} = \frac{\dot{m}_c\left(h_{ci} + \frac{h_{co,isentro} - h_{ci}}{\eta_k}\right) - \dot{m}_c \frac{h_{co}}{\hat{T}_{CO} + 273.15}T_{CO2}}{mc_c}, \quad (5)$$

where $T_{co}$ is the estimated compressor outlet temperature of the current iteration, $T_{co1}$ is a first compressor outlet temperature, $T_{co2}$ is a second compressor outlet temperature, $\hat{T}_{co}$ is the estimated compressor outlet temperature from the previous iteration, and 273.15 is a conversion factor for converting temperature from Celsius to Kelvin.

The first and second compressor outlet temperatures are variables used to estimate the compressor outlet temperature. The compressor outlet temperature module 52 may determine the first and second compressor outlet temperatures based on the refrigerant mass flow rate from the previous iteration using relationships (4) and (5) and numerical differentiation methods. The correction factor module 54 may then determine the inlet enthalpy correction factor based on the first and second compressor outlet temperatures and the measured compressor outlet temperature. The compressor outlet temperature module 52 may then estimate the compressor outlet temperature based on the first and second compressor outlet temperatures and the inlet enthalpy correction factor using relationship (3). The compressor outlet temperature module 52 outputs a signal indicating the first and second compressor outlet temperatures.

The correction factor module 54 determines the inlet enthalpy correction factor based on the first and second compressor outlet temperatures and the measured compressor outlet temperature from the compressor outlet temperature sensor 40 using a Kalman filter. For example, the correction factor module 54 may determine the inlet enthalpy correction factor using a relationships such as $$\hat{\Delta}_{k|k} = \hat{\Delta}_{k|k-1} + K_k(y_k - \hat{y}_{k|k-1}), \quad (6)$$

$$y_k = T_{co} - T_{co1}, \quad (7)$$

$$\hat{y}_{k|k-1} = \hat{\Delta}_{k|k-1} T_{co2}, \text{ and} \quad (8)$$

$$K_k = P_{k|k-1} T_{co2}(T_{co2} P_{k|k-1} T_{co2} + R_k)^{-1}, \quad (9)$$

where $\hat{\Delta}_{k|k}$ is the inlet enthalpy correction factor of the current iteration, $\hat{\Delta}_{k|k-1}$ is the inlet enthalpy correction factor of the previous iteration, $K_k$ is a Kalman filter gain, $y_k$ is an output of the current iteration, $\hat{y}_{k|k-1}$ is the output of the previous iteration, $T_{co}$ in relationship (7) is the measured compressor outlet temperature, $P_{k|k-1}$ is a state matrix of the previous iteration, and $R_k$ is a noise covariance matrix of the current iteration. Comparing the combination of relationships (6), (7), and (8) to relationship (3) reveals that the correction factor module 54 determines the inlet enthalpy correction factor based on a difference between the measured and estimated compressor outlet temperatures. The correction factor module 54 outputs a signal indicating the inlet enthalpy correction factor.

The refrigerant quality module 56 determines the quality of refrigerant at the compressor inlet 21 based on the compressor inlet enthalpy and the inlet enthalpy correction factor. For example, the refrigerant quality module 56 may determine the refrigerant quality using a relationship such as $$\chi = \frac{(1 + \hat{\Delta}_{k|k})h_{ci} - h_{SatLiq}}{h_{SatVap} - h_{SatLiq}}, \quad (10)$$

where x is the refrigerant quality, $h_{SatLiq}$ is a saturated liquid enthalpy of refrigerant at the compressor inlet 21, and $h_{SatVap}$ is a saturated vapor enthalpy of refrigerant at the compressor inlet 21. The refrigerant quality module 56 may determine the saturated liquid and vapor enthalpies based on the measured compressor inlet temperature and pressure using a lookup table. The refrigerant quality module 56 outputs a signal indicating the refrigerant quality.

The example implementation of the thermal system control module 48 shown in FIG. 2 further includes a refrigerant density module 58, a refrigerant flow rate module 60, a compressor power module 62, a compressor control module 64, a valve control module 66, and a fan control module 68. The refrigerant density module 58 determines the density of refrigerant at the compressor inlet 21 based on the refrigerant quality at the compressor inlet 21. For example, the refrigerant density module 58 may determine the refrigerant density using a relationship such as $$\rho = \frac{1}{\frac{(1-\chi)}{\rho_{SatLiq}} + \frac{\chi}{\rho_{SatVap}}}, \quad (11)$$

where $\rho$ is the refrigerant density, $\rho_{SatLiq}$ is a saturated liquid density of refrigerant at the compressor inlet 21, and $\rho_{SatVap}$ is a saturated vapor density of refrigerant at the compressor inlet 21. The refrigerant density module 58 may determine the saturated liquid and vapor densities based on the measured compressor inlet temperature and pressure using a lookup table. The refrigerant density module 58 outputs a signal indicating the refrigerant density.

The refrigerant flow rate module 60 determines the mass flow rate of refrigerant flowing through the compressor 20 based on the refrigerant density and the measured compressor speed. For example, the refrigerant flow rate module 60 may determine the refrigerant mass flow rate using a relationship such as $$\dot{m}_c = \frac{rpm_c}{60} \rho V_c \eta_v, \quad (12)$$

where $rpm_c$ is the measured compressor speed, 60 is a conversion factor for converting speed from revolutions per minute to revolutions per second, $V_c$ is the volume of the compressor 20, and $\eta_v$ is the volumetric efficiency of the compressor 20. The compressor volume and the compressor volumetric efficiency may be predetermined. The refrigerant flow rate module 60 outputs a signal indicating the refrigerant mass flow rate.

The compressor power module 62 determines the power output by the compressor 20 based on the refrigerant mass flow rate and the compressor inlet and outlet enthalpies. For example, the compressor power module 62 may determine the compressor power using a relationship such as $$P_c = \dot{m}_c(h_{co} - h_{ci}), \quad (13)$$

where $P_c$ is the compressor power. The compressor power module 62 outputs a signal indicating the compressor power.

The compressor control module 64 outputs a signal to the compressor 20 to control the speed thereof and/or the amount of power supplied thereto. The valve control module 66 outputs signals to the valves 22, 24, 26, 28 to control the positions thereof. The fan control module 68 outputs signals to the electric fan 30 and the blower 32 to control the speed thereof and/or the amount of power supplied thereto. Each of the compressor 20, the valves 22, 24, 26, 28, the electric fan 30, and the blower 32 may be referred to as an actuator. Each of the compressor control module 64, the valve control module 66, and the fan control module 68 may be referred to as an actuator control module.

The compressor control module 64 controls the speed of the compressor 20, and/or the amount of power supplied thereto, based on the refrigerant mass flow rate and/or the compressor power. Additionally or alternatively, the valve control module 66 controls the position of one or more of the valves 22, 24, 26, 28 based on the refrigerant mass flow rate and/or the compressor power. Additionally or alternatively, the fan control module 68 controls the speed of one or more of the electric fan 30 and the blower 32, and/or the amount of power supplied thereto, based on the refrigerant mass flow rate and/or the compressor power.

In one example, the compressor control module 64 increases or decreases the amount of power supplied to the compressor 20 when the compressor power increases or decreases, respectively. In another example, the valve control module 64 increases or decreases the opening amount(s) of one or more of the valves 22, 24, 26, 28 when the refrigerant mass flow rate is less than or greater than a target mass flow rate, respectively. In another example, the fan control module 68 increases or decreases the amount of power supplied to the electric fan 30 and the blower 32 when the refrigerant mass flow rate increases or decreases, respectively.

Figure 3:
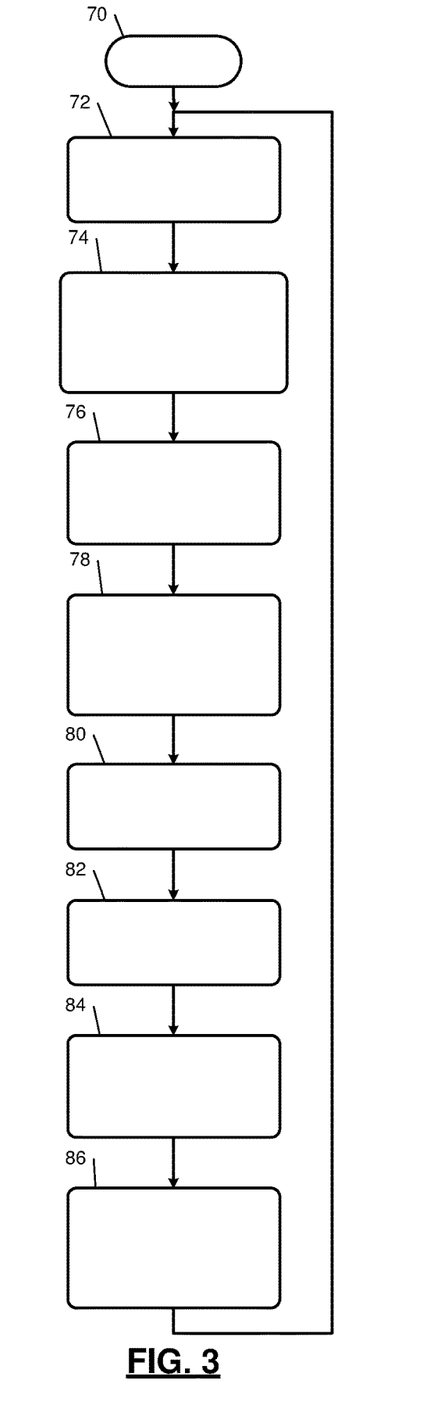
FIG. 3 is a flowchart illustrating an example control method according to the present disclosure.

Referring now to FIG. 3, an example method for estimating the quality of refrigerant at the inlet 21 of the compressor 20 in the thermal system 10 of FIG. 1 begins at 70. One or more (e.g., all) steps of the method of FIG. 3 may be performed via execution of instructions stored in a computer-readable medium. At 72, the compressor enthalpy module 50 determines the inlet and outlet enthalpies of the compressor 20. The compressor enthalpy module 50 may determine the compressor outlet enthalpy in both isentropic and non-isentropic conditions.

At 74, the compressor outlet temperature module 52 determines the first and second compressor outlet temperatures based on the refrigerant mass flow rate from the previous iteration and the compressor inlet and outlet enthalpies. At 76, the correction factor module 54 determines the inlet enthalpy correction factor based on the first and second compressor outlet temperatures using a Kalman filter. At 78, the refrigerant quality module 56 determines the quality of refrigerant at the compressor inlet 21 based on the inlet enthalpy correction factor and the compressor inlet enthalpy.

At 80, the refrigerant density module 58 determines the density at the compressor inlet 21 based on the refrigerant quality at the compressor inlet 21. At 82, the refrigerant mass flow rate module 60 determines the mass flow rate of refrigerant at the compressor inlet 21 based on the refrigerant density at the compressor inlet 21. At 84, the compressor power module 62 determines the power output by the compressor 20 based on the refrigerant mass flow rate at the compressor inlet 21. At 86, one or more of the actuator control modules in the thermal system control module 48 control(s) one or more actuators in the thermal system 10 based on the refrigerant mass flow rate and/or the compressor power. The method then returns to 72. Each completion of 72 through 86 may be referred to as an iteration.

As discussed above, changes in the quality of refrigerant circulating through a thermal system of an electric vehicle may lead to inaccurate calculations of the refrigerant mass flow rate, which can adversely affect the performance and efficiency of the thermal system. In addition, liquid refrigerant entering a compressor of the thermal system may damage the compressor. To address these issues, a system, method, and computer-readable medium according to the present disclosure is configured to estimate the refrigerant quality at the compressor inlet based on a compressor inlet enthalpy and an inlet enthalpy correction factor. The system, method, and computer-readable medium is configured to determine the inlet enthalpy correction factor based on an estimated temperature at the compressor outlet and a measured temperature at the compressor outlet. The system, method, and computer-readable medium is configured to determine the refrigerant mass flow rate based on the refrigerant quality, which improves the performance and efficiency of the thermal system and prevents compressor damage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a compressor outlet temperature module configured to estimate a temperature at an outlet of a compressor in a thermal system of an electric vehicle;
a refrigerant quality module configured to estimate a quality of refrigerant at an inlet of the compressor based on an enthalpy at the compressor inlet and an inlet enthalpy correction factor, wherein the refrigerant quality is a ratio of vapor refrigerant mass to total refrigerant mass;
a correction factor module configured to determine the inlet enthalpy correction factor based on the estimated compressor outlet temperature and a temperature measured at the compressor outlet; and
an actuator control module configured to control at least one of the compressor and a heat exchanger in the thermal system based on the inlet enthalpy correction factor.

2. The system of claim 1 wherein the correction factor module is configured to determine the inlet enthalpy correction factor based on the estimated and measured compressor outlet temperatures using a Kalman filter.

3. The system of claim 2 wherein the correction factor module is configured to determine the inlet enthalpy correction factor in a current iteration based on the inlet enthalpy correction factor from a previous iteration, a Kalman filter gain, and the estimated and measured compressor outlet temperatures.

4. The system of claim 1 wherein the compressor outlet temperature module is configured to estimate the compressor outlet temperature using a linear model of work performed by the compressor.

5. The system of claim 1 wherein the compressor outlet temperature module is configured to estimate the compressor outlet temperature based on the compressor inlet enthalpy, an enthalpy at the compressor outlet, and a mass flow rate of refrigerant flowing through the compressor.

6. The system of claim 5 wherein the compressor outlet temperature module is configured to estimate the compressor outlet temperature in a current iteration based on the compressor inlet and outlet enthalpies from a previous iteration and the refrigerant mass flow rate from the previous iteration.

7. The system of claim 5 further comprising a compressor enthalpy module configured to determine the compressor inlet enthalpy in a current iteration based on the estimated refrigerant quality from a previous iteration, a temperature measured at the compressor inlet, and a pressure measured at the compressor inlet.

8. The system of claim 7 wherein the compressor enthalpy module is configured to determine the compressor outlet enthalpy based on the measured compressor outlet temperature and a pressure measured at the compressor outlet.

9. The system of claim 1 further comprising:
a refrigerant density module configured to determine a density of refrigerant at the compressor inlet based on the estimated refrigerant quality;
a refrigerant flow rate module configured to determine a mass flow rate of refrigerant flowing through the compressor based on the refrigerant density; and
a compressor power module configured to determine a power output by the compressor based on the refrigerant mass flow rate, the compressor inlet enthalpy, and an enthalpy at the compressor outlet.

10. The system of claim 9 wherein the actuator control module is configured to control at least one of the compressor and the heat exchanger in the thermal system based on at least one of the refrigerant mass flow rate and the compressor power.

11. A system comprising:
a compressor outlet temperature module configured to estimate a temperature at an outlet of a compressor in a thermal system of an electric vehicle based on an enthalpy at an inlet of the compressor, an enthalpy at the compressor outlet, and a mass flow rate of refrigerant flowing through the compressor;
a refrigerant quality module configured to estimate a quality of refrigerant at the compressor inlet based on the estimated compressor outlet temperature and a temperature measured at the compressor outlet, wherein the refrigerant quality is a ratio of vapor refrigerant mass to total refrigerant mass; and
an actuator control module configured to control at least one of the compressor and a heat exchanger in the thermal system based on the quality of refrigerant.

12. The system of claim 11 wherein the compressor outlet temperature module is configured to estimate the compressor outlet temperature using a linear model that relates the compressor outlet temperature to the compressor inlet and outlet enthalpies and the refrigerant mass flow rate.

13. The system of claim 11 wherein the compressor outlet temperature module is configured to estimate the compressor outlet temperature in a current iteration based on the compressor inlet and outlet enthalpies from a previous iteration and the refrigerant mass flow rate from the previous iteration.

14. The system of claim 11 further comprising a compressor enthalpy module configured to determine the compressor inlet enthalpy in a current iteration based on the estimated refrigerant quality from a previous iteration, a temperature measured at the compressor inlet, and a pressure measured at the compressor inlet.

15. The system of claim 14 wherein the compressor enthalpy module is configured to determine the compressor outlet enthalpy based on the measured compressor outlet temperature and a pressure measured at the compressor outlet.

16. The thermal system of claim 11 wherein the refrigerant quality module is configured to estimate the refrigerant quality based on a difference between the estimated and measured compressor outlet temperatures.

17. The thermal system of claim 11 wherein the refrigerant quality module is configured to estimate the refrigerant quality based on the compressor inlet enthalpy and an inlet enthalpy correction factor.

18. The thermal system of claim 17 further comprising a correction factor module configured to determine the inlet enthalpy correction factor based on the estimated and measured compressor outlet temperatures using a Kalman filter.

19. The system of claim 18 wherein the correction factor module is configured to determine the inlet enthalpy correction factor in a current iteration based on the inlet enthalpy correction factor from a previous iteration, a Kalman filter gain, and the estimated and measured compressor outlet temperatures.

20. A method comprising:
- estimating a temperature at an outlet of a compressor in a thermal system of an electric vehicle;
- estimating a quality of refrigerant at an inlet of the compressor based on an enthalpy at the compressor inlet and an inlet enthalpy correction factor, wherein the refrigerant quality is a ratio of vapor refrigerant mass to total refrigerant mass;
- determining the inlet enthalpy correction factor based on the estimated compressor outlet temperature and a temperature measured at the compressor outlet; and
- controlling at least one of the compressor and a heat exchanger in the thermal system based on the inlet enthalpy correction factor.

* * * * *